SYMMETRICAL NEUTRALIZED MOUNTING OF AMPLIFIERS OF LARGE POWER FOR SHORT WAVES

Filed May 5, 1945 2 Sheets-Sheet 1

INVENTOR
HENRI GRUMEL
By Hazeltine, Lake & Co.
AGENTS

INVENTOR
HENRI GRUMEL
By:
Haseltine, Lake & Co.
AGENTS

Patented Aug. 29, 1950 2,520,765

UNITED STATES PATENT OFFICE 2,520,765

SYMMETRICAL NEUTRALIZED MOUNTING OF AMPLIFIERS OF LARGE POWER FOR SHORT WAVES

Henri Grumel, Paris, France, assignor to Societe Francaise Radio-Electrique, a corporation of France Application May 5, 1945, Serial No. 592,097
In France February 27, 1941

Section 1, Public Law 690, August 8, 1946
Patent expires February 27, 1961

7 Claims. (Cl. 179—171)

This invention is for improvements relating to symmetrical neutralized mountings of amplifiers operating with short waves of great power.

The principal object of the invention is to nullify in the mountings of amplifiers of the above nature, any reaction between the input circuit and the output circuit, by means of a simple arrangement in such manner as to permit the working of the amplifier in a sufficiently extended range of wave lengths without having to regulate other members than the tuning elements of the anode and grid oscillating circuits. A further object of the invention is to reduce to a minimum the apparent power put into play in the output circuits, by the reduction of the parasite capacities.

The invention will now be described with reference to the accompanying drawings.

Figure 3:
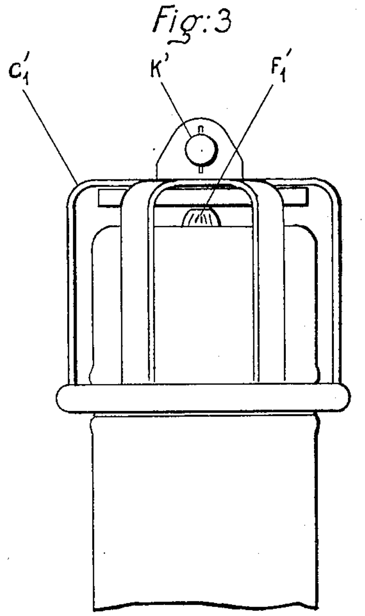
Figure 4:
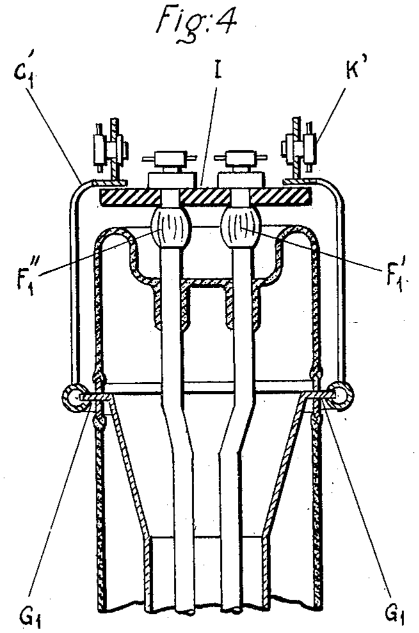
Figure 5:
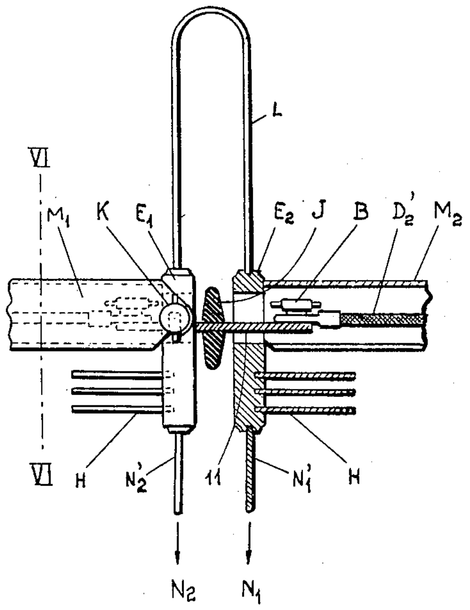
Figure 6:
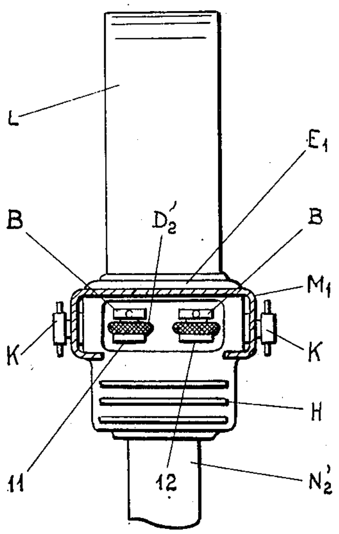

Figures 3 and 4 are respectively an elevation of and vertical section through the mounting of the elements of the device according to the invention in connection with the valve; and Figures 5 and 6 are respectively a longitudinal section and side view of those elements which are connected with the tuning elements of the grid oscillating circuit. (Figures 3 and 5 represent one form of embodiment respectively of the upper left hand portion and the upper central portion of Figure 1.)

Amplifiers according to the invention are of a known type designated neutralized push-pull amplifiers. Such an amplifier comprises essentially (see Fig. 2):

*a*. Two electron discharge devices $L_1$, $L_2$.

*b*. An input circuit $C_E$ connected between the control grids $G_1G_2$ of the valves $L_1L_2$, the point of symmetry O being grounded.

*c*. An output circuit $C_s$ connected between the anodes $A_1A_2$, the point of symmetry $O_1$ being also grounded.

*d*. Two neutralizing capacities $A_1N_1$ and $A_2N_2$ connected respectively between the anode $A_1$ and the grid $G_2$ and between the anode $A_2$ and grid $G_1$. The function of these capacities is to neutralize the coupling effects between the input and output circuits, effects which are due to the "anode-grid" capacities of each valve; these latter capacities and the neutralizing capacities constitute the four elements of a Wheatstone bridge, and since this bridge is kept in a state of balance, current variations in the output circuit forming one diagonal of the bridge exert no influence on the input circuit forming the other diagonal.

A first characteristic of the invention consists in locating the cathode conductors $D_1D_2$ respectively inside the grid conductors $C_1C_2$ throughout substantially their whole length. Thus conductor $D_1$ is inside conductor $C_1$ between the exit point of grid $G_1$ and the intermediate point $E_1$; and conductor $D_2$ is inside conductor $C_2$ between the exit point of grid $G_2$ and the intermediate point $E_2$. And points $E_1E_2$ are very close to the point of symmetry grounded at O. The principal objective is the maximum degree of balance in the inductive tension drop along conductors $C_1$ and $D_1$, and the ideal would be when points $E_1E_2$ coincide with O. But in practice, points $E_1E_2$ have different potentials and must be kept separate and must be insulated from point O which is grounded. They are therefore brought as close as possible to O.

A second characteristic of the invention consists in providing means for giving the neutralizing connections $N'_1$ and $N'_2$ connecting intermediate points $E_2$ and $E_1$ respectively to neutralizing capacities $N_1$ and $N_2$, a reactance equal to the reactance of each of the grid conductors $C_1$ and $C_2$.

This second characteristic of the invention is combined with the first, and the combination brings forth an improvement in neutralized push-pull amplifiers. It is known to locate cathode conductors inside grid conductors; but such an arrangement used alone in neutralized push-pull amplifiers would bring forth defective results as will be explained presently.

Assume as follows:

$l$ the self-induction coefficient of each of grid conductors $C_1$, $C_2$;

$m$ the coefficient of mutual induction between each cathode conductor $D_1$ or $D_2$ and the surrounding grid conductor $C_1$ or $C_2$;

L the self-induction coefficient of each of the neutralizing connections $N'_1$ and $N'_2$;

M the coefficient of mutual induction between the neutralizing connections $N'_1$ and $N'_2$;

$i$ the intensity of the high frequency current issuing from the anode circuit;

$w$ the angular velocity of current $i$.

The drop of inductive potential along grid conductor $C_1$ is:

$$v=l.w.i \qquad (1)$$

in dependence of current $i$; which amounts to saying that the current $i$ would influence the difference of potential between points O and E, if cathode conductor $D_1$ were not surrounded by grid conductor $C_1$. As this surrounding is provided, the current $i$ flowing in grid conductor $C_1$ induces in cathode conductor $D_1$ an electro-motive force $$v'=m.w.i \quad (2)$$

Now, the coefficient of mutual induction between two concentric conductors is equal to the self-induction coefficient of the outer conductor of said concentric conductors. Therefore, $m=l$, and $v'$ compensates exactly $v$, so that the current $i$ does not react on the input circuit $C_E$.

The grid conductors $C_1$ and $C_2$ surrounding the cathode conductors are constituted by envelopes of relatively large section and consequently their self-induction coefficient $l$ is appreciably smaller than the self-induction coefficient L of the neutralizing connections $N'_1$ and $N'_2$. Now, in neutralized push pull amplifiers, a current $i$ flows also in neutralizing connections $N'_1$ and $N'_2$, and the drop of potential along this connection is:

$$v''=L.w.i \quad (3)$$

As $l$ is smaller than L, $v$ given by (1) is smaller than $v''$ given by (3), which amounts to saying that the current $i$ would influence the difference of potential between points $E_1$ and $E_2$, and there would be a reaction of the output circuit $C_S$ on the input circuit $C_E$. This drawback is avoided if, according to the second characteristic of the invention, means are provided for giving to each of the neutralizing connections $N'_1$ and $N'_2$ a reactance $R''$ equal to the reactance R of each of the grid conductors $C_1$ and $C_2$ (under the term reactance, it is understood the reactive resistance opposed to the flowing of current $i$).

The drop of inductive potential along conductor $C_1$ or $C_2$ is then:

$$v=Ri \quad (4)$$

and the drop of inductive potential along connections $N'_1$ or $N'_2$ is:

$$v''=R''i \quad (5)$$

The equality of R and $R''$ causes the equality of $v$ and $v''$, and the current $i$ has no influence on the input circuit $C_E$.

A simple means of having $R=R''$ consists in coupling the connections $N'_1N'_2$ so that the coefficient M of mutual induction between them equals the difference of self-induction coefficients L and $l$ hereinbefore defined.

$$M=L-l \quad (6)$$

The connections $N'_1$ and $N'_2$ being so coupled, and the current $i$ flowing in opposite directions in these connections, the reactance of each of them is:

$$R''=(L-M)w \quad (7)$$

substituting the value of M given by (6), $$R''=lw$$

that is the reactance R of grid conductors $C_1$ or $C_2$.

The carrying out of the invention presents particular features when applied to high power amplifiers as especially contemplated by the invention; the valves become difficult to manipulate, owing to their weight, their fragility and the slight gripping surface they present. In practice it has been necessary to effect manipulations by means of lifting apparatus necessitating a total disengagement above the valve. Furthermore, the joining of the connections through which flow heating currents which may attain and even exceed 500 A. is difficult to carry out owing to the presence of the grid conductors $C_1$, $C_2$.

Various suggestions of grid conductors detachable in several parts have been made, but the placing in position thereof is long and complicated. It has now been found that it is not at all necessary that the grid conductors be constituted by completely closed envelopes. Apertures of even considerable extent may be made in them while preserving entirely the advantages of the mounting, provided the apertures and the inner conductors are properly arranged.

Figures 1, 2:
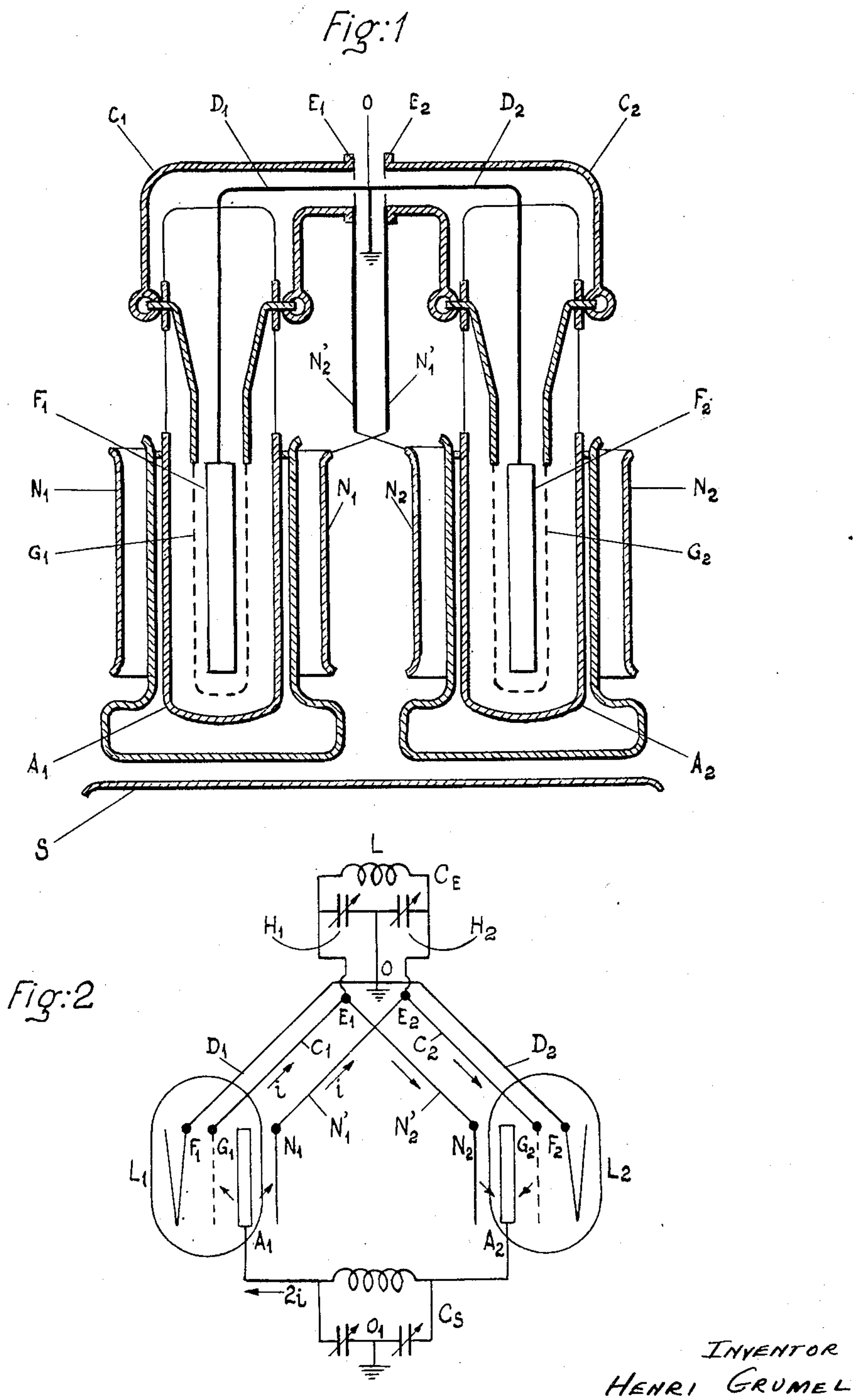
Figure 1 shows the arrangement according to the invention in principle and quite diagrammatically.
Figure 2 is a diagram showing the electrical circuit of the said arrangement.

According to the invention, the following practical arrangement, given by way of example, is carried out, which offers numerous advantages:

In this embodiment, the grid conductor $C_1$ of Figure 1 comprises three parts:

1. A hood $C'_1$ (Figs. 3 and 4) perforated or otherwise, in cast or stamped metal covers the top of the valve and is fixed, either directly over the grid outlets $G_1$, $G_1$ or on the glass bulb and in this latter case is joined by flexible connections to the grid outlets. The filament outlets $F'_1$, $F''_1$ pass through this hood at the top thereof and at the centre. They consist either of flexible plates or of rigid terminals which it is advisable to fix, with the interposition of insulators I between the outlets and the hood.

2. An apertured plate or ring-like element $E_1$ (see Figs. 5 and 6) which is fixed relatively to the frame supporting the whole assembly. This plate is a cast piece and materializes point $E_1$ of Figure 1 while a similar plate $E_2$ symmetrically positioned (Fig. 5) materializes point $E_2$ of Fig. 1.

Insulators such as J fixed relatively to plates $E_1$ and $E_2$ support connecting rods or bars 11 and 12 to which are attached terminals such as B to which in turn are attached flexible leads $D'_2$ constituting a part of the cathode conductor $D_2$ of Figure 1. Externally plates $E_1$ and $E_2$ have a number of different bosses; one at the upper part to take the self-inductance L of the oscillating circuit, others at the lower part to take the blocks H of the fixed armatures of the variable tuning condenser $H_1$; $H_2$ of Fig. 2 and the neutralizing connections $N'_1$, $N'_2$ and others on the lateral faces to take the detachable feeder elements $M_1$, $M_2$ of connection with the valve, which are held by fixing screws K.

3. A medium portion or envelope partially opened $M_1$ (Figs. 5 and 6) connecting hood $C'_1$ of the tube to fixed plate $E_1$. For establishing the connections for the tube, the filament is first connected by means of flexible leads $D'_2$ which involves no difficulty since at this time the medium portion constituted by an inverted channel enclosure or split casing such as $M_1$ has not been assembled. The next step is to position this portion $M_1$ surrounding the filament connections and to fix it on the one hand to plate $E_1$ by screws such as K, and on the other hand to hood $C'_1$ by screws K' provided on said hood (see Figs. 3 and 4). Location of the tubes is therefore just as easy as with conventional assemblies.

It is of advantage to use the features hereinbefore described, in association with features described in U. S. Patent 2,270,157, granted on application Serial Number 293,152, filed September 2, 1939, relating to the same kind of amplifiers. For instance, to use neutralizing capacities constituted by the respective anodes of the valves and cylinders surrounding these anodes, and condensers of the output circuit constituted by the respective lower parts of the anodes and an adjustable plate, such as S on Fig. 1, situated below these lower parts.

The invention is not limited to the embodiments herein described or illustrated; and many modifications may be contemplated without departing from the scope of the invention; for instance, instead of triodes with external anode there may be used valves with more than three electrodes or valves with electrodes situated inside a glass bulb.

What I claim is:

1. A neutralized push-pull amplifier including two electron discharge devices or valves having each at least one anode, a cathode and a grid; an input circuit connected between the grids of said valves and having a point of symmetry; two cathode conductors for connecting respectively the cathodes of said valves to said point of symmetry; an output circuit connected between the anodes of said valves; two neutralizing capacities respectively connected to said anodes; two intermediate points situated on each side of the axis of symmetry through said point of symmetry and only very slightly spaced from said point; two grid conductors for connecting said grids respectively to said intermediate points, said grid conductors surrounding respectively said cathode conductors; two neutralizing connections for connecting respectively said intermediate points to said neutralizing capacities so that the anode of each valve is connected to the grid of the other valve through one of said neutralizing capacities; and means provided for giving to each of said neutralizing connections a reactance equal to the reactance of each of said grid conductors.

2. A neutralized push-pull amplifier as claimed in claim 1, wherein each grid conductor includes: a hood connected to the grid outlet, a fixed apertured plate situated at the intermediate point of the valve under consideration, and a removable envelope connected on one side with the hood and on the other side with the fixed apertured plate.

3. A neutralized push-pull amplifier as claimed in claim 1, wherein each grid conductor includes: a hood connected to the grid outlet, a fixed apertured plate situated at the intermediate point of the valve under consideration, and a split casing connected by easily detachable means on one side with said hood and on the other side with said fixed apertured plate.

4. A neutralized push-pull amplifier as claimed in claim 1, wherein each grid conductor includes: a hood connected to the grid outlet, a fixed apertured plate situated at the intermediate point of the valve under consideration, and a removable envelope connected on one side with the hood and on the other side with the fixed apertured plate, and wherein the conductors connected to the neutralizing capacities, the fixed plates of the condenser of the grid circuit and the self inductance of this circuit are fixed on the aforesaid fixed apertured plates.

5. A valve for neutralized push-pull amplifier as claimed in claim 1 comprising a metallic hood fixed on the valve and connected to the control grid outlet of the valve.

6. A valve for neutralized push-pull amplifier as claimed in claim 1, comprising a metallic hood fixed on the valve and connected to the control grid outlet of the valve, an insulating piece fixed on said hood, and cathode terminals fixed on said insulating piece.

7. A neutralizing push pull amplifier including two electron discharge devices or valves having each at least an anode, a cathode and a grid; an input circuit connected between the grids of said valves and having a point of symmetry; two cathode conductors for connecting respectively the cathodes of said valves to said point of symmetry, an output circuit connected between the anodes of said valves; two neutralizing capacities respectively connected to said anodes; two intermediate points situated on each side of the axis of symmetry through said point of symmetry and only very slightly spaced from said point; two grid conductors for connecting said grids respectively to said intermediate points, said grid conductors surrounding respectively said cathode conductors; two neutralizing connections for connecting respectively said intermediate points to said neutralizing capacities so that the anode of each valve is connected to the grid of the other valve through one of said neutralizing capacities, said neutralizing connections being so arranged as to be inductively coupled together, the mutual induction coefficient of the coupling being equal to the difference between the self-induction coefficient of one of said neutralizing connections and the self-induction coefficient of one of said grid conductors.

HENRI GRUMEL.

REFERENCES CITED

The following references are of record in the file of this patent:

UNITED STATES PATENTS

| Number | Name | Date |
|---|---|---|
| 1,995,339 | Buschbeck | Mar. 26, 1935 |
| 2,228,939 | Zottu | Jan. 14, 1941 |
| 2,235,414 | White | Mar. 18, 1941 |
| 2,272,062 | George | Feb. 3, 1942 |

FOREIGN PATENTS

| Number | Country | Date |
|---|---|---|
| 813,706 | France | Mar. 1, 1937 |
| 816,136 | France | Apr. 26, 1937 |